Oct. 13, 1970 — A. Q. MAURER — 3,533,847
FUEL CELL ASSEMBLY
Filed Feb. 23, 1967
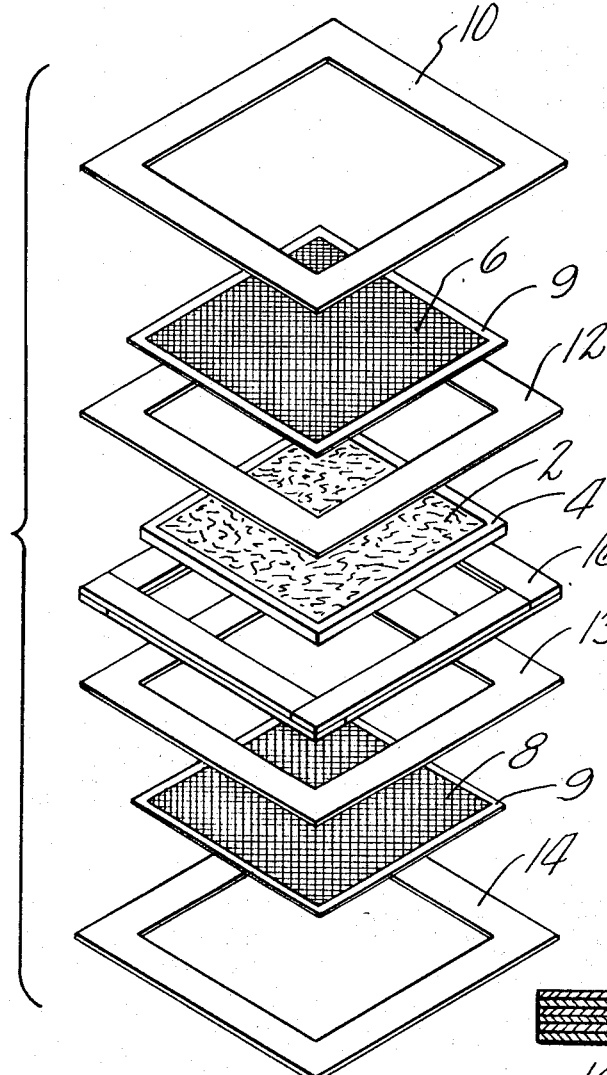
FIG_1
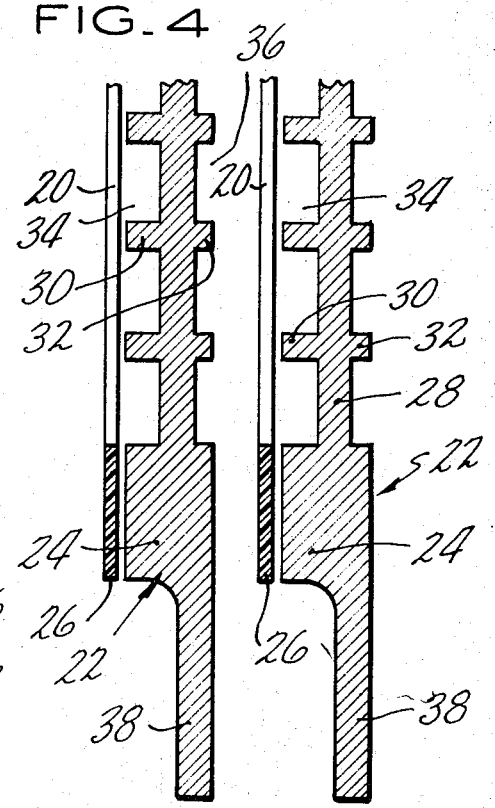
FIG_4
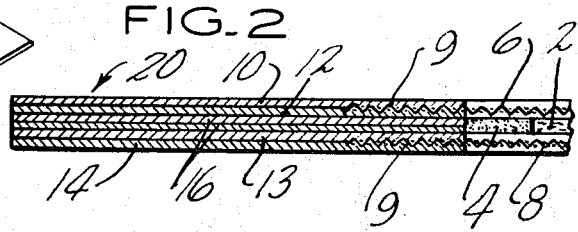
FIG_2
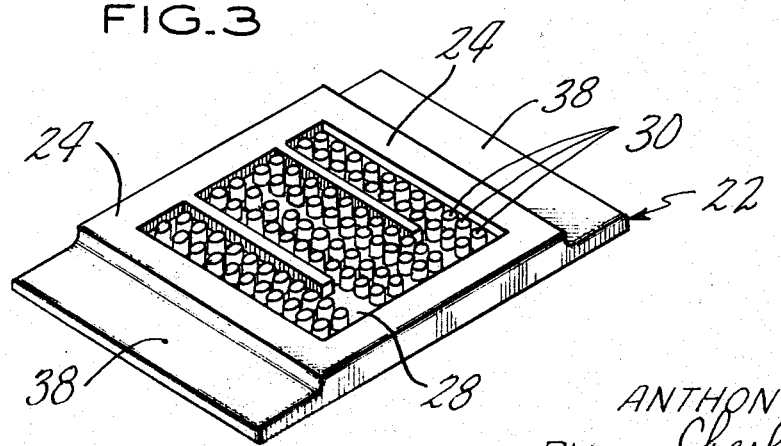
FIG_3
INVENTOR
ANTHONY O. MAURER
BY Charles G. Warren
ATTORNEY ial Oct. 13, 1970 — 3,533,847

3,533,847
FUEL CELL ASSEMBLY
Anthony O. Maurer, Glastonbury, Conn., assignor to United Aircraft Corporation, East Hartford, Conn., a corporation of Delaware
Filed Feb. 23, 1967, Ser. No. 617,955
Int. Cl. H01m 27/00
U.S. Cl. 136—86      5 Claims

ABSTRACT OF THE DISCLOSURE

A fuel cell assembly wherein the electrolyte matrix and the electrodes are all secured into a unitary assembly by a peripheral frame which secures the several elements and serves as a containment for the electrolyte in the matrix, and in which the frames serve as spacers and insulators between adjacent fuel and oxidizer plates located on opposite sides of the individual cell assemblies in a module.

BACKGROUND OF THE INVENTION

The present invention relates to a fuel cell assembly and particularly to a unitized assembly of a cell to form one component of a module.

For the purpose of producing the required power from a fuel cell module, it is essential to assemble a plurality of cells in a stack and to interconnect them electrically as required. Such assembly is simplified by a unitized cell that in itself is a compact subassembly.

SUMMARY OF THE INVENTION

A feature of this invention is, therefore, a compact unitary cell assemblage in which the electrodes and the interpored matrix for the electrode form a single element.

Another feature is a compact fuel cell assemblage having a frame-like peripheral edge that is of uniform thickness and is impregnated with a dielectric binder, the latter securing the several elements of the cell together to form an insulator and spacer between the collector plates that are associated with the cell assembly to define the fuel and oxidizer chambers to collect the electricity produced by the cell.

In accordance with the invention, the matrix that receives the electrolyte has a surrounding frame that is impregnated with a binder and each electrode on opposite sides of the matrix has a similar frame that overlaps the edges of the electrode and corresponds in shape to the frame on the matrix and the several frames are stacked and suitably adhered together to form a unitary fuel assembly suitable for stacking in a fuel cell module.

BRIEF DESCRIPTION OF THE DRAWINGS

Other features and advantages will be apparent from the specification and claims, and from the accompanying drawings which illustrate an embodiment of the invention.

FIG. 1 is an exploded view in perspective of the several elements making up the cell assembly.

FIG. 2 is a sectional view through the cell assembly showing duplicate spacer plates on opposite sides of the cell that form the chambers for fuel and oxidant.

FIG. 3 is a perspective view of one of the spacer plates.

FIG. 4 is a sectional view through a portion of a fuel cell module.

DESCRIPTION OF THE PREFERRED EMBODIMENT

The fuel cell assemblage is made up of a central sheet of an absorbent matrix 2 which is impregnated with an electrolyte when the cell is in use. The electrolyte may preferably be an aqueous solution of potassium hydroxide although other base or acid electrolytes may be used. The matrix may be made of asbestos fibers but particularly of a fibrous material that is nonreactive with the electrolyte utilized. The edge of the matrix 2 is impregnated with a binder 4 of a dielectric material impervious to the electrolyte which may, for example, be an epoxy which is curable under heated and pressure. This binder preferably extends only a small distance in from the edge of the matrix 2.

Electrodes 6 and 8 are positioned on opposite sides of the electrolyte matrix and these electrodes may be a nickel screen electrode coated with a suitable catalyst which may be a mixture of polytetrafluoroethylene and platinum. Other electrodes may be used and an alternative may be, for example, a sintered nickel-oxide electrode either of single or double porosity. The peripheries of these electrodes are free of catalyst for a short distance in from the edge and this portion 9 of the electrodes is clamped between frame elements 10 and 12 for the electrode 6 and elements 13 and 14 for the electrode 8. The frame elements are wider than the edge portions of the electrodes to extend therebeyond as is best shown in FIGS. 1 and 2. The frame elements are made up of a thin porous material, for example, fiberglass or paper which is absorbent to permit impregnation by a suitable binder that will cooperate with the binder used in the periphery of the absorbent matrix 2. One example is a conventional type of filter paper and the impregnating binder may be a resin with an accelerator mixed therein such that the frames are completely impregnated and will serve as insulators when the fuel cell is assembled with others into a module.

The asbestos matrix 2 is surrounded by a frame 16 of substantially the same thickness as the matrix and this frame is also impregnated with a suitable binder that is compatible with the frame elements previously mentioned. A material particularly useful for this frame element may be fiberglass which is fibrous enough to retain its desired configuration and is adapted to be impregnated by the epoxy utilized. The inside dimension of the frame 16 is the same as the outside dimension of the matrix 2 so that the latter fits securely therein. The several elements above described are arranged in stacked relation, one with respect to the other and assemblage is then molded at 250° to 350° at a pressure of between 140 to 160 lbs. per square inch applied only to the frame elements thereof. The temperatures and pressures given are based on use of a particular resin identified as Epon 828 mixed with a suitable curing agent utilizing five parts of resin to one part of curing agent. Obviously other dielectric binders such as thermoplastics or thermosetting resins may be used.

The resulting structure forms a complete fuel cell assembly 20 or unitized fuel cell as shown in section in FIG. 2. From this figure it can be seen that the resulting frame assemblage is of substantially the same thickness as the portion of the fuel cell made up of the matrix and the overlying electrodes. The catalyst free edge portions of the electrodes become embedded in the electrode frames. The effect of the impregnated frame elements under the curing action is to produce a unitary frame element surrounding the effective part of the fuel cell and of substantially the same thickness. The finished structure is relatively thin and with the particular type of screen electrode utilized the entire thickness of the cell may be from .04 to .05 inch. This dimension is found to be effective for an area dimension for the electrodes of 5 to 5½ inches and a frame width of from ½ to ¾ of an inch. The completed structure is reasonably flexible to the extent that bending of the fuel cell to a limited extent is not detrimental and the complete fuel cell may be assembled as a unit within a fuel cell module. The effect of the dielectric binder that retains the several elements of the fuel cell together is to form a leakproof assemblage with the cooperating spacer plates, the binder functioning to seal the individual fuel cell assemblies and the adjacent parts of the module.

Referring now to FIG. 4, the individual fuel cell assembly 20 will have positioned on opposite sides thereof spacer plates 22 that define the fuel and oxidant chambers on opposite sides of the fuel cell assembly. It is apparent that both electrodes have essentially the same area dimension as the matrix. Each plate 22 has a peripheral frame portion 24 of substantially the same dimension as the composite frame 26 surrounding the fuel cell and made up of the several frame elements above described. Thus, when the assemblage of fuel cells and spacer plates is clamped securely together the portions 24 engage the frames 26 and form a gas tight construction. The fuel cell frames also serve as an insulator between the spacer plates.

Inwardly of the frame portions 24 of each of the plates, the latter is substantially thinner as at 28 and has projections 30 and 32 on opposite sides thereof, these projections terminating in the same plane as the frame portions 24 and contacting the electrodes when the assemblage is clamped together. Thus, these spacer plates define a chamber 34 on one side thereof between the central portion 28 and the associated electrode of the fuel cell and another chamber 36 on the other side of the spacer plate between the thinner portion 28 and the cooperating electrode of the adjacent fuel cell. Fuel preferably in the form of hydrogen is supplied to the several chambers 36 and an oxidizer, preferably air, is supplied to the chambers 34. Connections for accomplishing this are described in the Gelting Pat. No. 3,436,272. Since this arrangement is not part of the present invention it need not be described in detail. It is sufficient to note that the passages for delivering the fuel and oxidant to the several compartments are formed in the frame portions 24 of the spacer plates.

These spacer plates may also have outwardly projecting cooling fins 38, the function of which is to assist in maintaining the desired operating temperature of the cell by the flow of cooling air over these fins. This is not a feature of the present invention and will not be described further.

I claim:
1. In a fuel cell, a thin flexible molded frame assembly including a matrix for electrolyte, a non-conducting frame consisting essentially of a porous material containing a dielectric binder surrounding the matrix and substantially the thickness of the matrix, an anode electrode on one side and a cathode electrode on the opposite side of the matrix and both electrodes being substantially the same area dimension as the matrix, each electrode consisting essentially of a screen substrate coated with a suitable catalyst, the edge of each electrode being free of catalyst, a non-conducting frame consisting essentially of a porous material containing a dielectric binder surrounding each electrode within which the catalyst free edge of the electrode is embedded wherein the electrode frames and the matrix frame are bonded together to form the assembly frame.

2. The fuel cell assembly as in claim 1 in which the matrix frame is a fibrous material impregnated with a curable binder impervious to the electrolyte and the matrix peripheral edge is impregnated with a curable binder impervious to the electrolyte.

3. The fuel cell as in claim 1 in which the frame for each electrode comprises two sheets of fibrous material impregnated with a dielectric binder.

4. The fuel cell assembly as in claim 1 in which the several frames when adhered together form a peripheral unitized frame for the assembly that is of uniform thickness, of substantially uniform width and is substantally the thickness of the operating portion of the fuel cell.

5. The fuel cell as in claim 1 in which the electrode frames are of a paper-like material and the matrix frame is fiberglass, all of said frames being impregnated with a curable dielectric resin imprevious to the electrolyte.

References Cited

UNITED STATES PATENTS

| | | | |
|---|---|---|---|
| 3,126,302 | 4/1964 | Drushella | 136—86 |
| 3,134,696 | 5/1964 | Douglas et al. | 136—86 |

WINSTON A. DOUGLAS, Primary Examiner

H. A. FEELEY, Assistant Examiner

PO-1050
(5/63)

UNITED STATES PATENT OFFICE
CERTIFICATE OF CORRECTION

Patent No. 3,533,847      Dated October 13, 1970

Inventor(s) Anthony O. Maurer

It is certified that error appears in the above-identified patent and that said Letters Patent are hereby corrected as shown below:

| | |
|---|---|
| Claim 2, column 4, line 20 | delete "assembly" |
| Claim 4, column 4, line 28 | delete "assembly" |
| Claim 5, column 4, line 36 | change "imprevious" to -- impervious -- |

December 29, 1970

(SEAL)
Attest:

Edward M. Fletcher, Jr.
Attesting Officer

WILLIAM E. SCHUYLER, JR.
Commissioner of Patents